Figure 2:
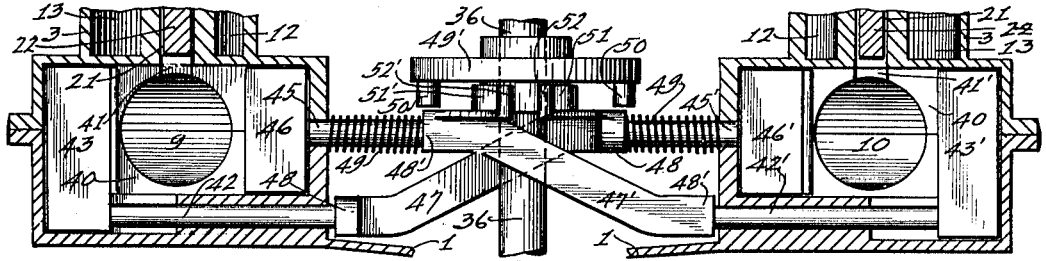

O. C. BEARD.
INTERNAL COMBUSTION ENGINE.
APPLICATION FILED JUNE 19, 1916.

1,270,245.

Patented June 18, 1918.
11 SHEETS—SHEET 1.

Witnesses,
J. D. Haskin
Geo. E. Marlatt

Inventor,
Oscar C. Beard,
By L. Whirl Mich
Attorney.

O. C. BEARD.
INTERNAL COMBUSTION ENGINE.
APPLICATION FILED JUNE 19, 1916.
1,270,245.
Patented June 18, 1918.
11 SHEETS—SHEET 2.
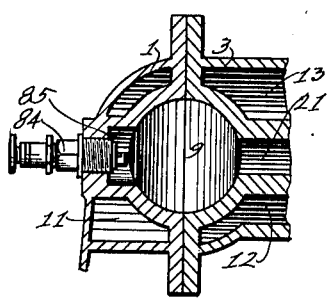
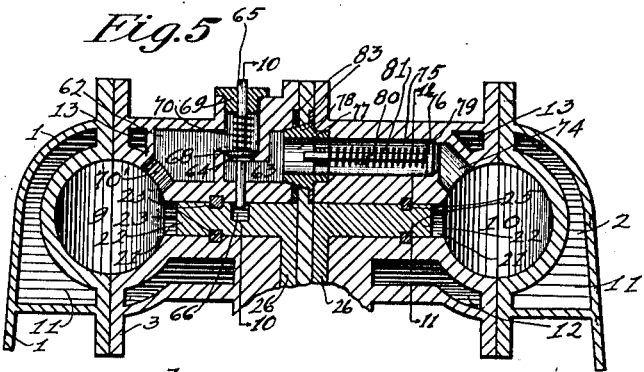
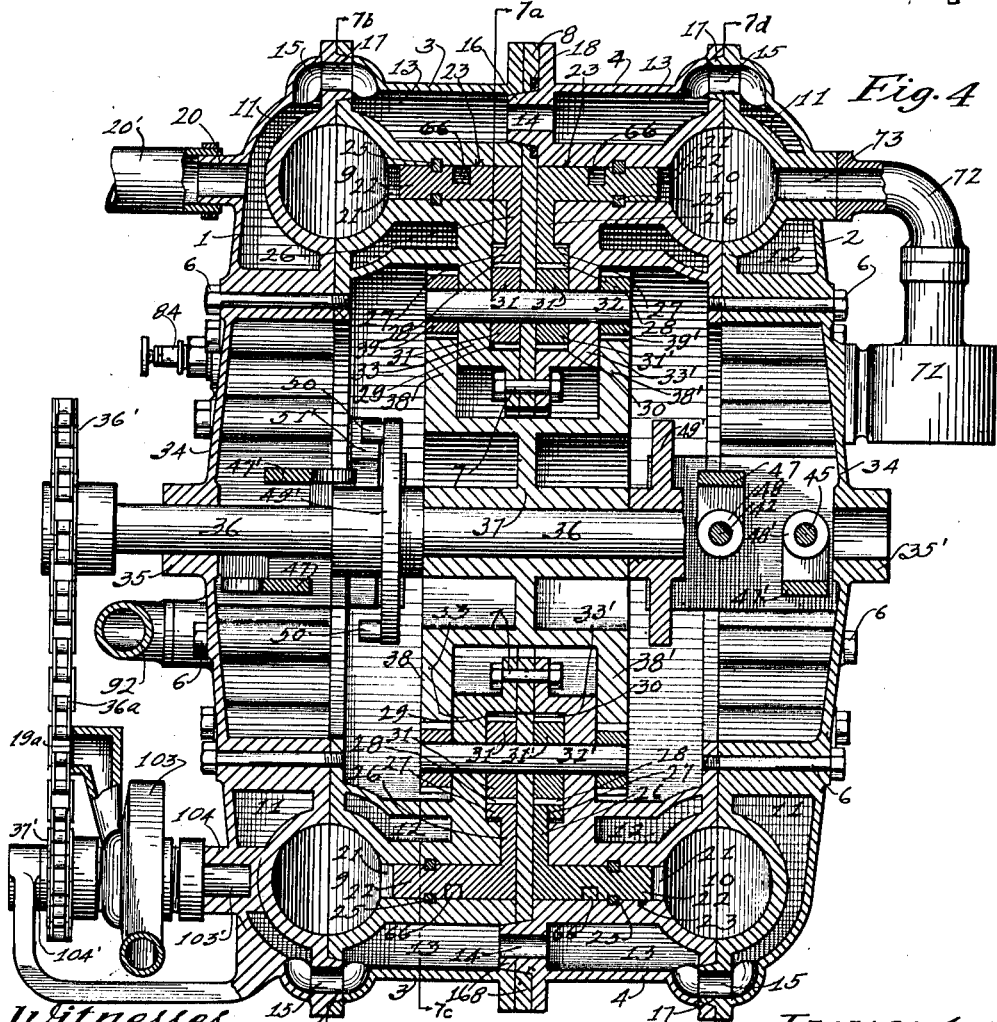
Witnesses
Inventor
Oscar C. Beard
Attorney O. C. BEARD.
INTERNAL COMBUSTION ENGINE.
APPLICATION FILED JUNE 19, 1916.
1,270,245.
Patented June 18, 1918.
11 SHEETS—SHEET 3.
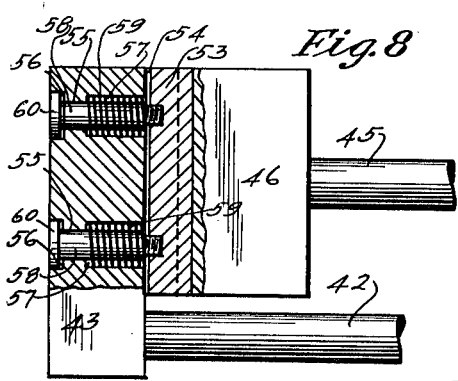
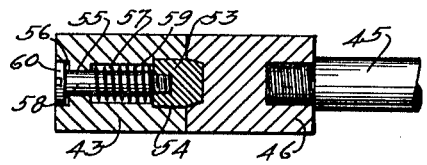
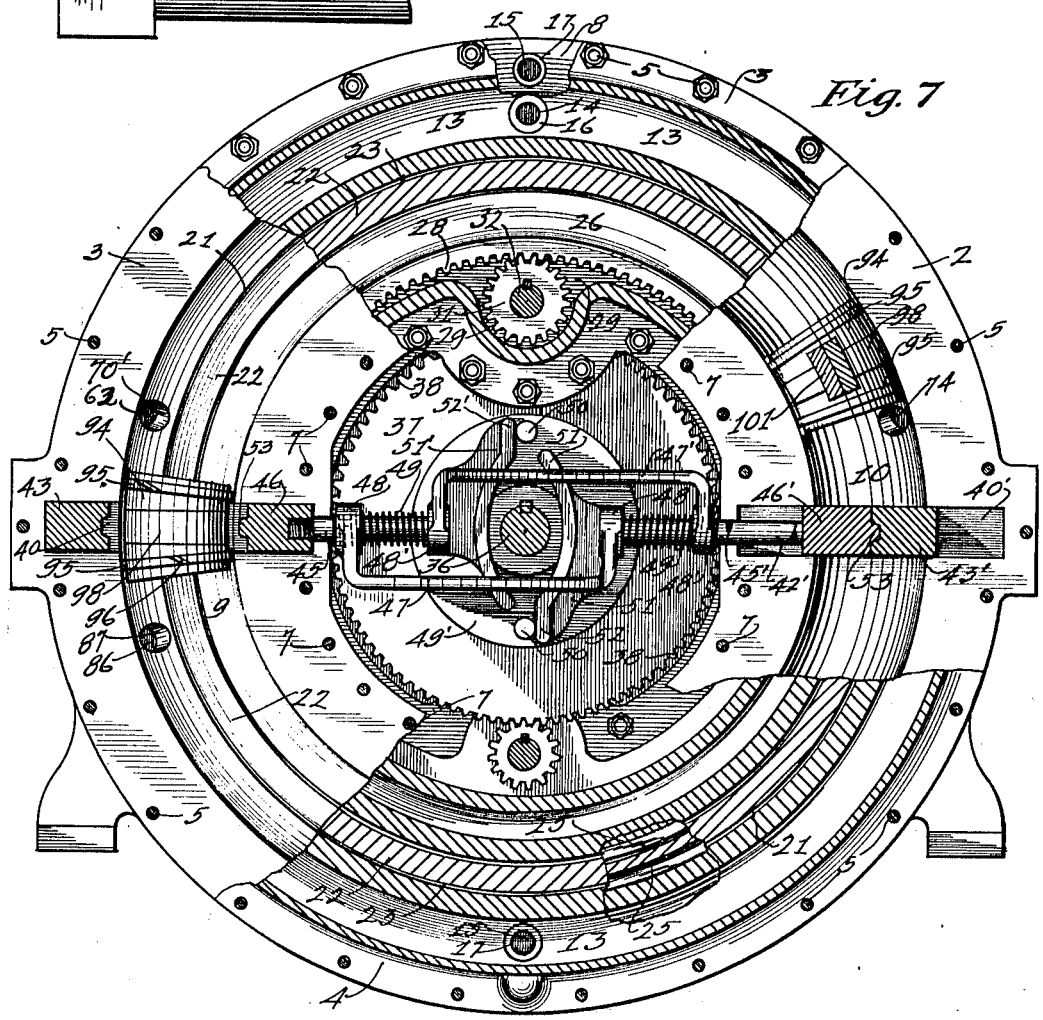

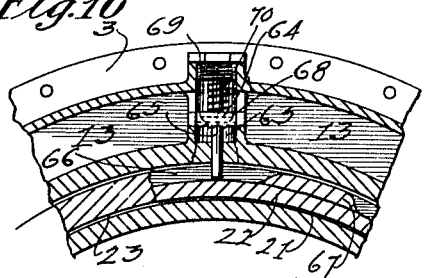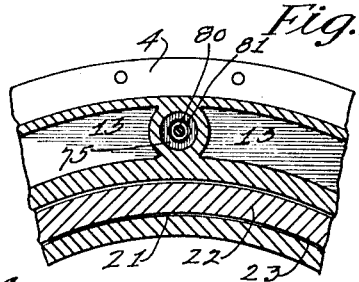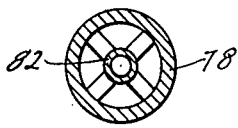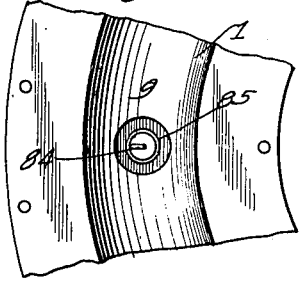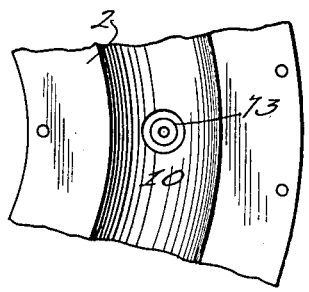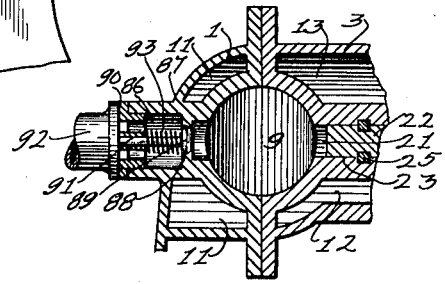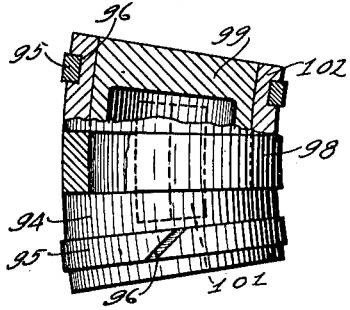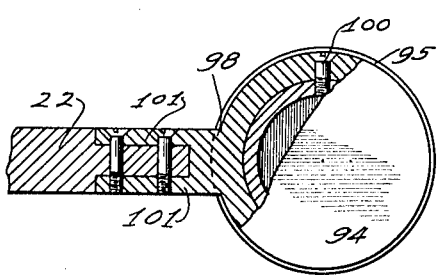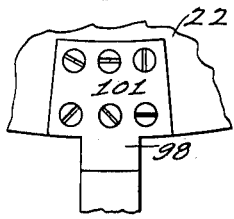

O. C. BEARD.
INTERNAL COMBUSTION ENGINE.
APPLICATION FILED JUNE 19, 1916.
1,270,245.
Patented June 18, 1918.
11 SHEETS—SHEET 5.
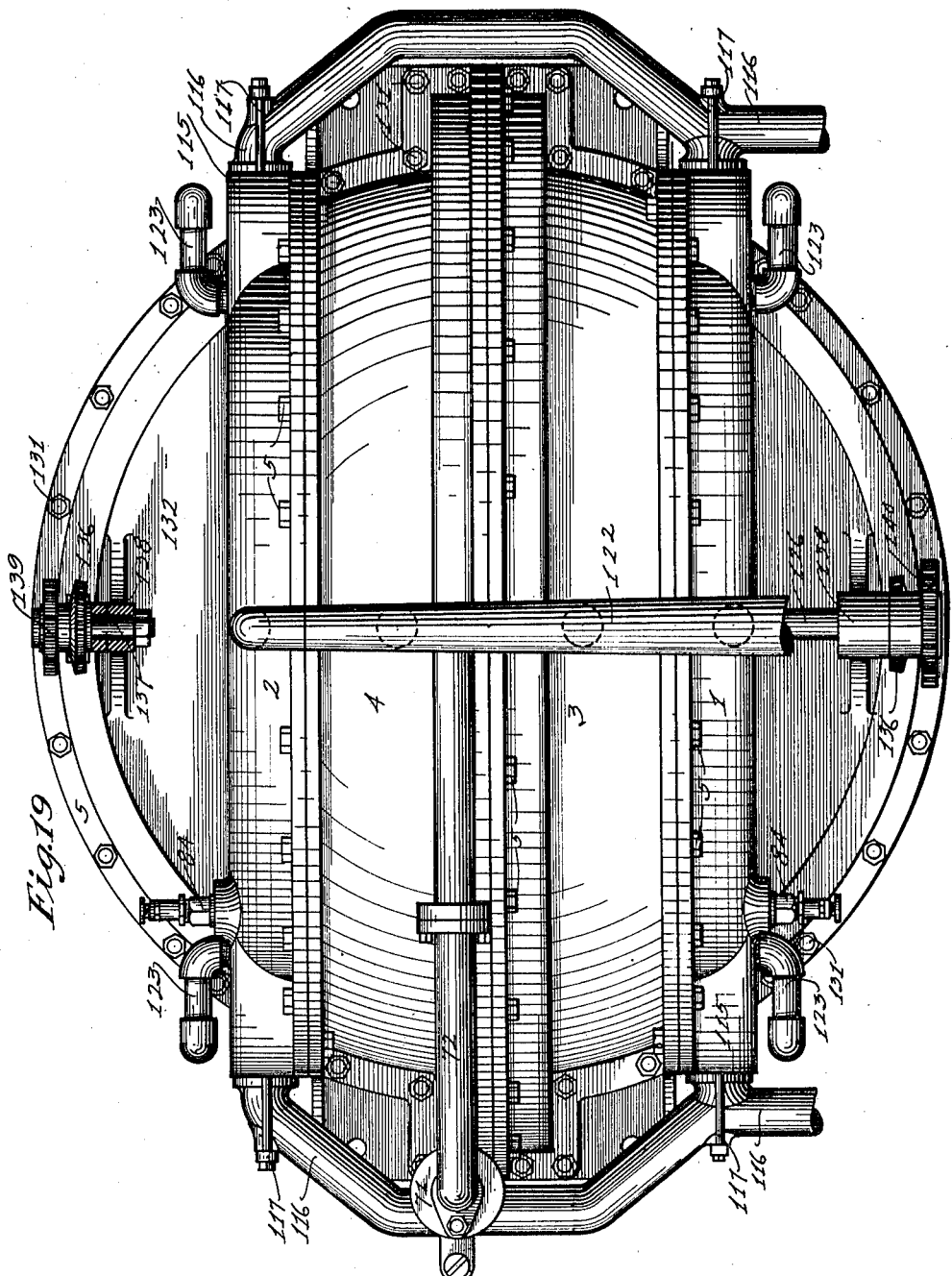
Witnesses,
J. D. Haskin
Geo. E. Marlatt
Inventor.
Oscar C. Beard
By Wm. L. Mack
Attorney.

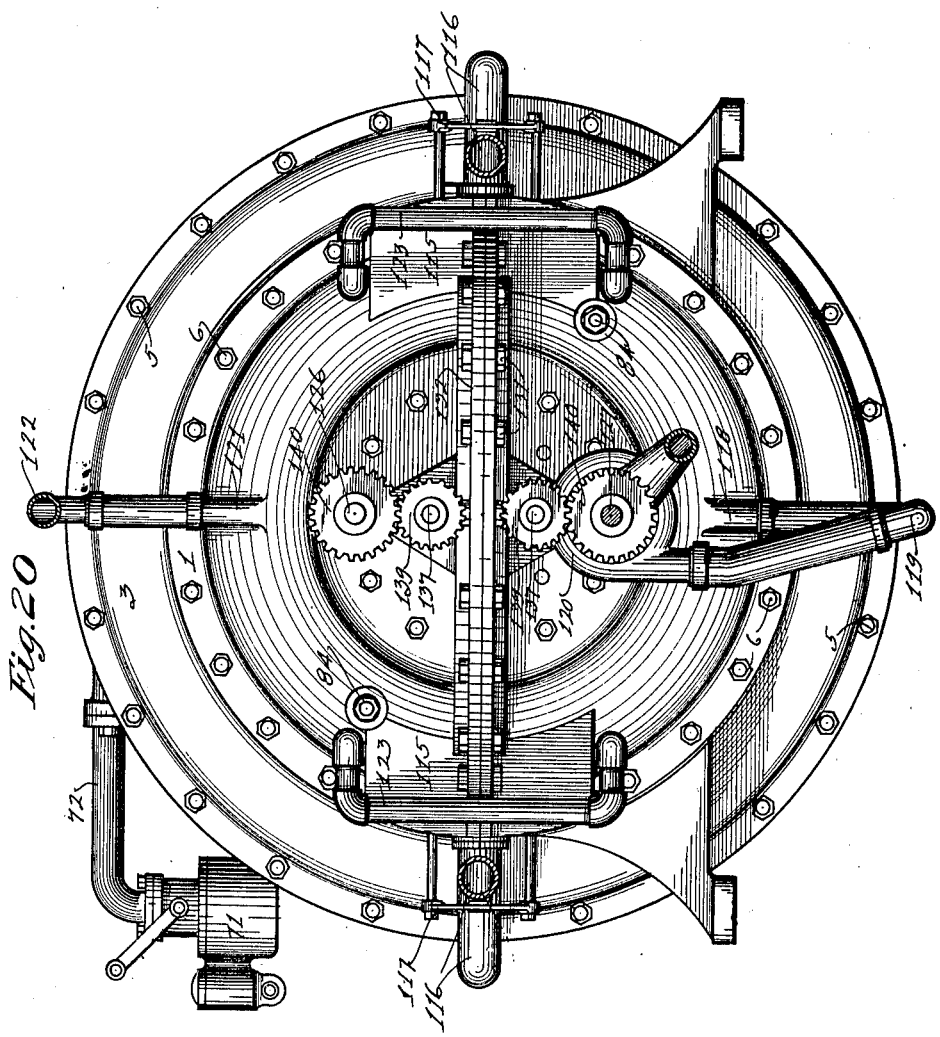

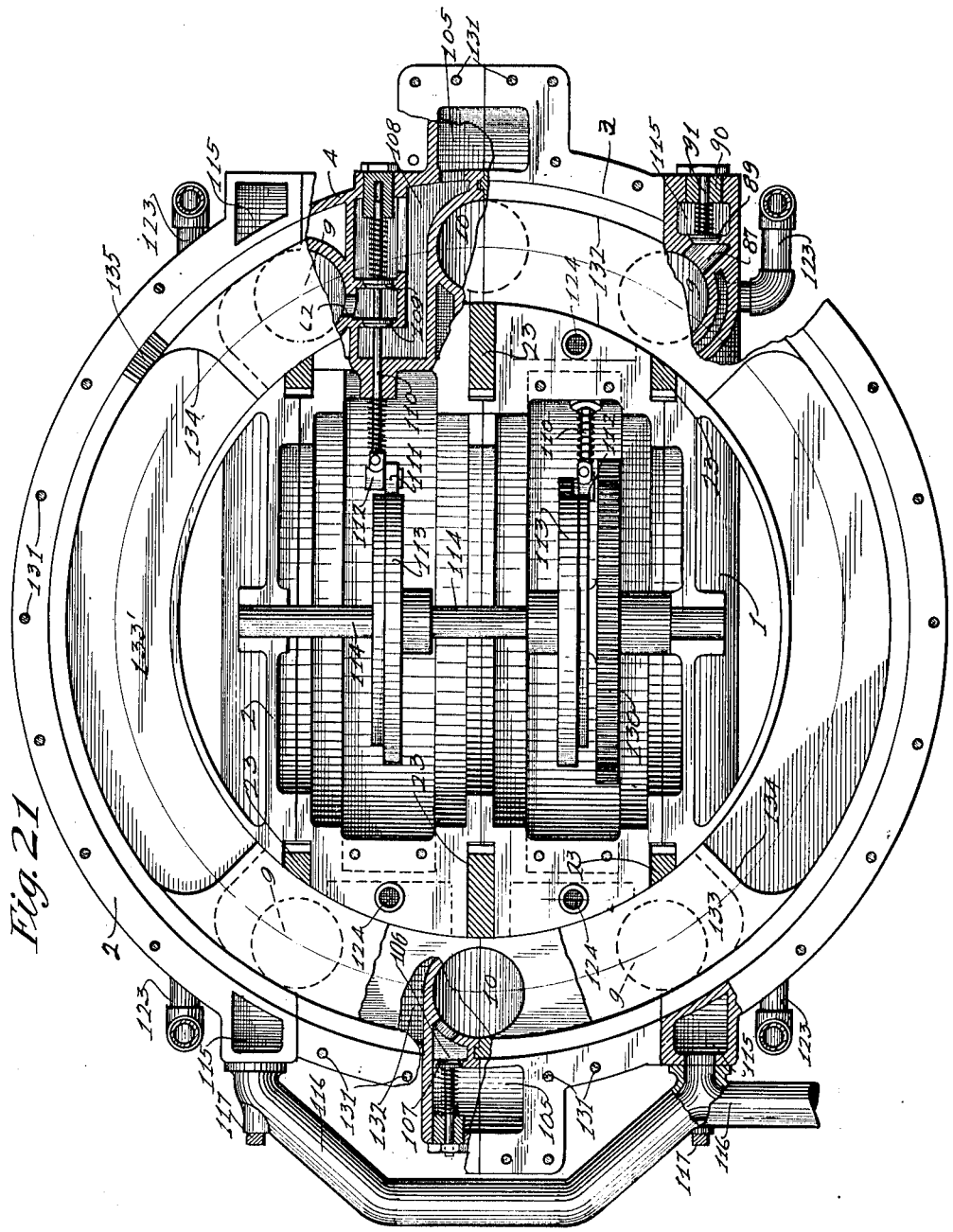

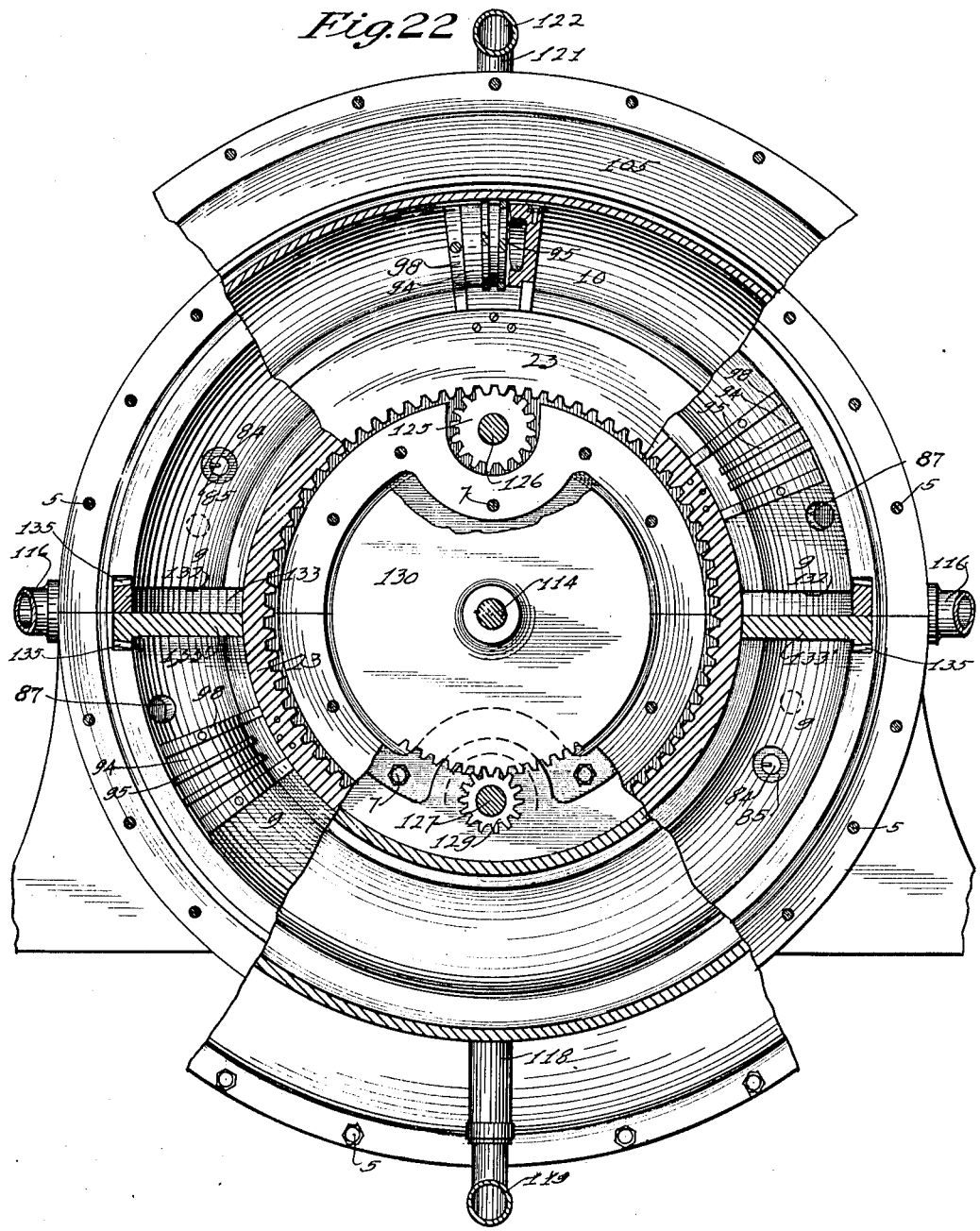

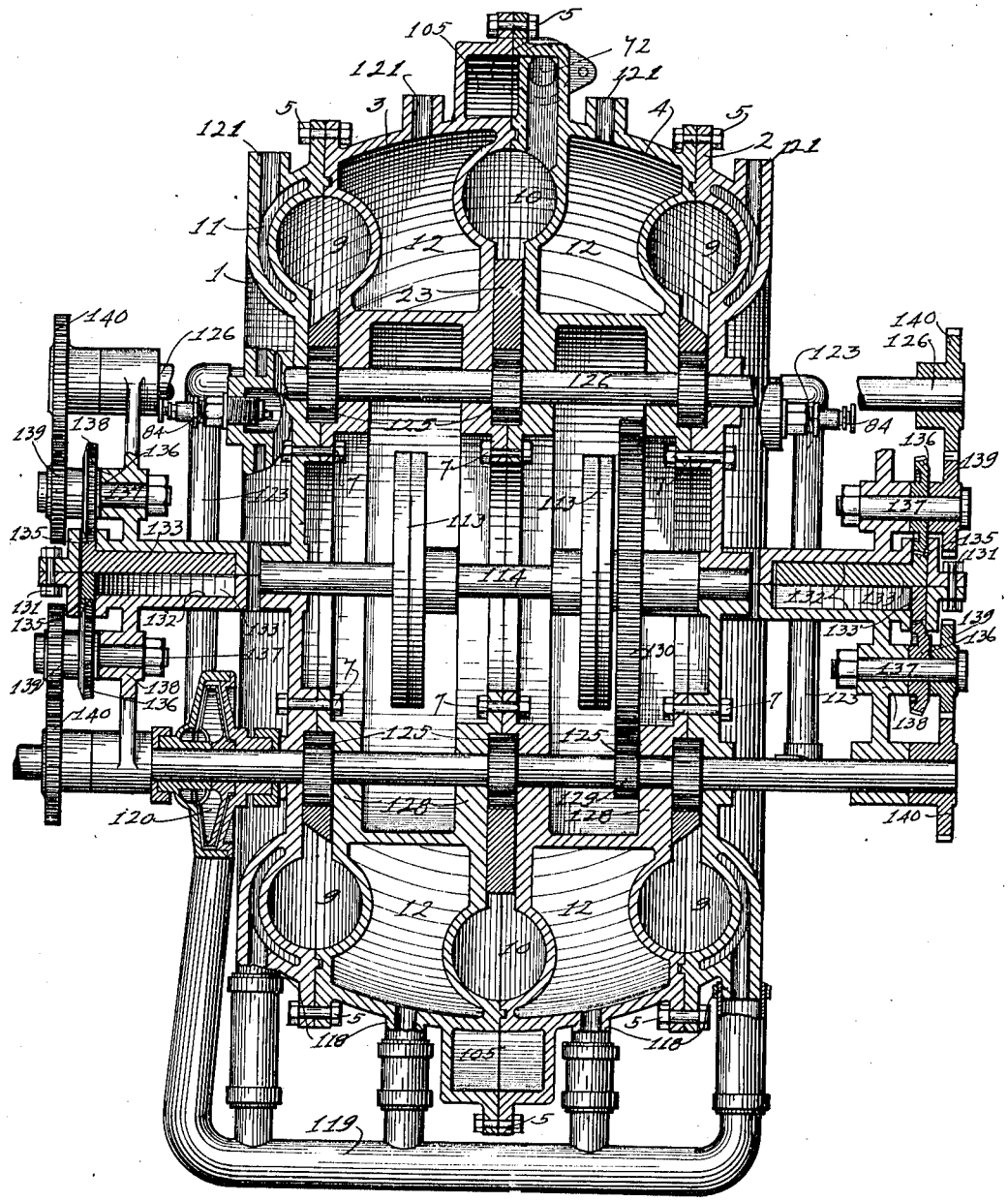

O. C. BEARD.
INTERNAL COMBUSTION ENGINE.
APPLICATION FILED JUNE 19, 1916.
1,270,245.
Patented June 18, 1918
11 SHEETS—SHEET 10.
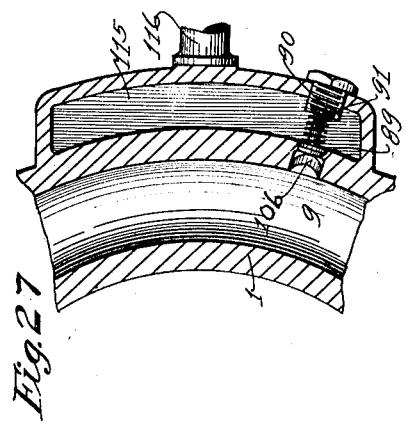
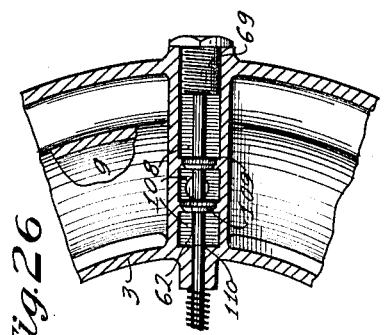
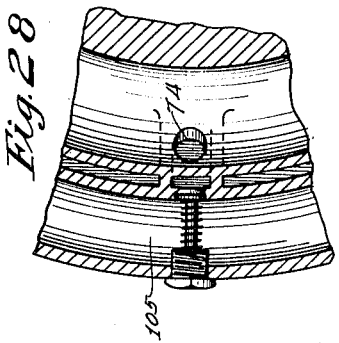
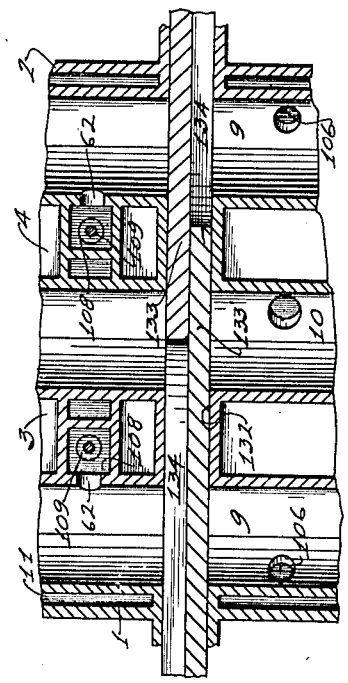
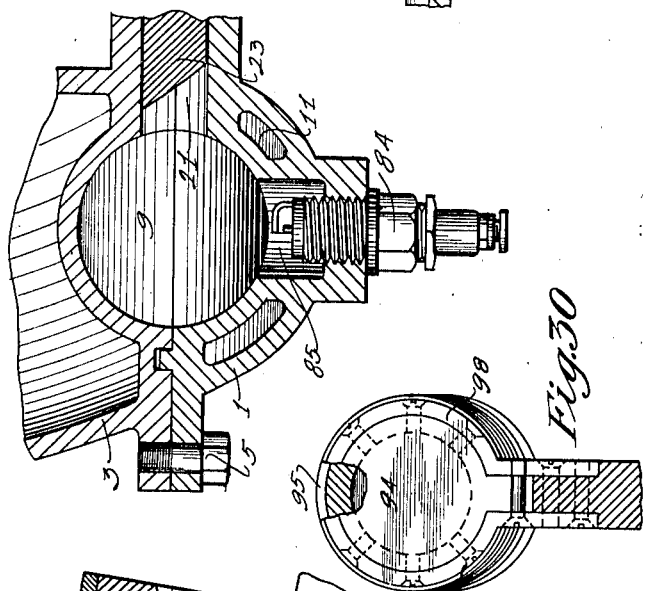
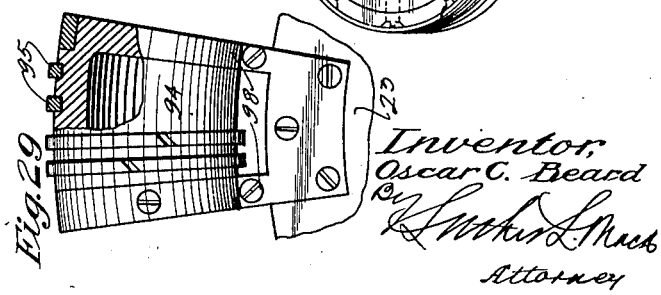
Witnesses,
J. D. Haskin
Geo E Marlatt
Inventor,
Oscar C. Beard
By Arthur L. Mack
Attorney

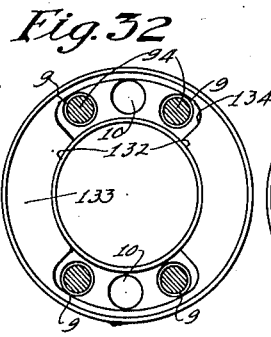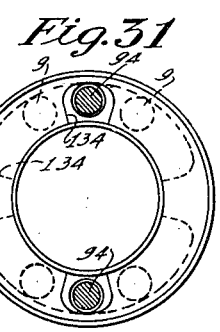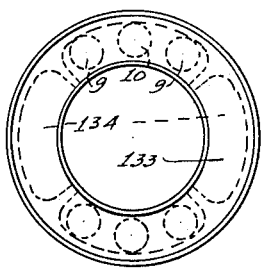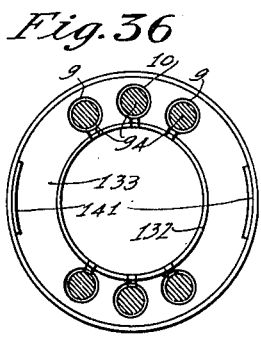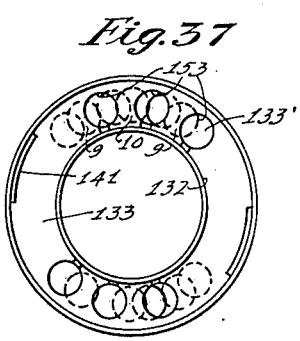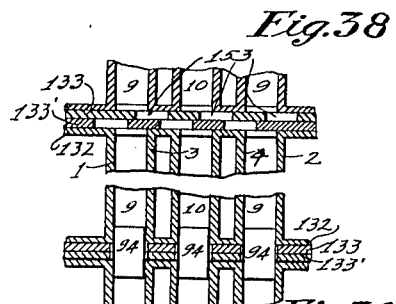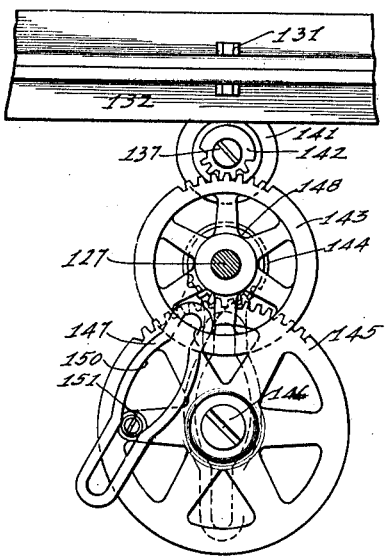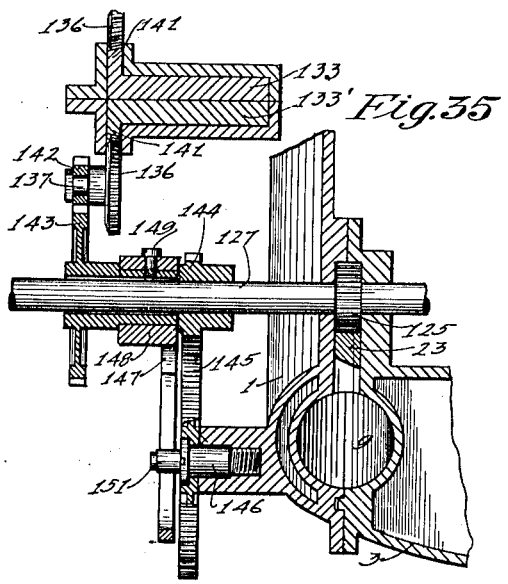

UNITED STATES PATENT OFFICE.

OSCAR C. BEARD, OF LOS ANGELES, CALIFORNIA, ASSIGNOR OF ONE-FOURTH TO RICHARD P. BEARD, OF UNION, WEST VIRGINIA.

INTERNAL-COMBUSTION ENGINE.

1,270,245.

Specification of Letters Patent.

Patented June 18, 1918.

Application filed June 19, 1916. Serial No. 104,527.

*To all whom it may concern:*

Be it known that I, OSCAR C. BEARD, a citizen of the United States, residing at Los Angeles, in the county of Los Angeles and State of California, have invented a new and useful Improvement in Internal-Combustion Engines, of which the following is a specification.

My invention relates to internal combustion engines of the rotary type and has for a primary object the provision of such an engine having one or more annular cylinders, which for the purposes which will hereinafter be fully set forth, are preferably arranged about a common axis with the centers of all of the cylinders radiating from a common point, the diameters of the several cylinders being slightly different, and a plurality of rotatable pistons being provided in each of the cylinders.

A further object is to provide means whereby the gas which is introduced into the cylinders prior to the explosions, may be compressed independently of the power producing pistons and stored in its compressed state adjacent to the cylinders in readiness for use, a separate cylinder and set of pistons being used solely for the purpose of compressing the gas, which cylinder and pistons are similar to the cylinders in and the pistons on which the force of the exploding gases is expended.

A further object is to provide means cutting the plane of the cylinders at right angles for successively opening and closing the cylinders one or more times at each revolution of the rotors so as to subdivide the explosion or combustion cylinders into segmental combustion chambers, the cylinder closures forming one of the ends of each of the chambers and the pistons the other ends; these closures serving practically as movable cylinder heads.

A further object is to provide one or more rotors for the pistons which are capable of being driven by the pistons and are arranged internally for transmitting the power to a point or points exterior of the engine casing.

A further object is to provide water cooling means for all portions of the engine casing which may become heated during the operation of the engine and means actuated by the rotors for causing the circulation of the water through the casing water jackets.

A further object is to provide means for automatically and regularly actuating the movable cylinder heads at successive intervals and internal gear drive means for transmitting motion to the driving gears, all or most of the operating parts of my engine being submerged in oil, and thus well lubricated at all times. Other objects will appear as the description of my invention progresses.

In the drawings, to which reference is had, several forms of device are shown in order that the full scope of my invention may be apparent to those skilled in the art, and though some of the modifications shown are radically different from other forms, the same form of cylinders are shown in each case, and also the same principle is employed, except for minor changes which are necessary to conform to changes in the operating means.

Figure 1:
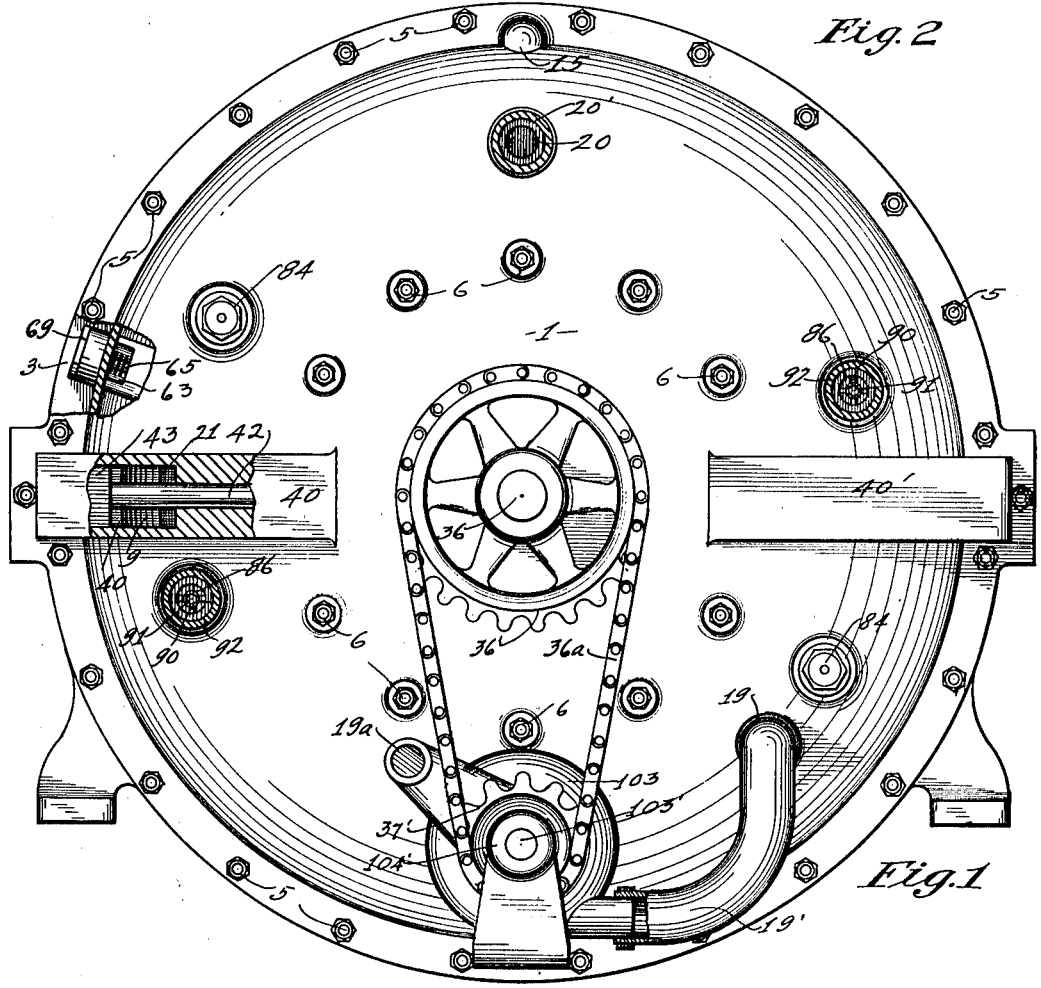
Figure 3:
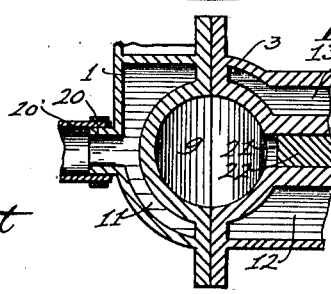

Similar characters of reference are used in the specifications and the several views of the drawings to indicate the same or like parts, and referring particularly to the drawings, Figure 1 is an end elevation of my engine partially broken away at points. Fig. 2 is a sectional plan of the same through the cylinder head chambers. Fig. 3 is a fragmentary section of the water jacket and outlet therefor on a plane at right angles to Fig. 1. Fig. 4 is a sectional elevation of the engine on a longitudinal plane through the center. Fig. 5 is a diagonal section of Fig. 1 through the combustion cylinder gas intake, and Fig. 6 is a similar section through the spark chamber thereof. Fig. 7 is a composite sectional elevation at right angles to Fig. 4, the upper portion being taken on the line 7ª—, the lower section on the line 7ᶜ, the right hand section on the line 7ᵈ—7ᵈ, and the left hand section on the line 7ᵇ—7ᵇ of Fig. 4 and this figure being otherwise broken away to illustrate certain other features. Fig. 8 is an enlarged plan, partly in section of a form of cylinder head, and Fig. 9 is a sectional elevation of the same.

Fig. 10 is a section on the line 10—10 of Fig. 5; Fig. 11 is a section on the line 11—11 of Fig. 5. Fig. 12 is a fragmentary view of the inside of the cylinder showing the spark chamber and plug. Fig. 13 is a view similar to Fig. 12 showing the compression cylinder gas intake. Fig. 14 is a section of the valve plugs typical of both the exhaust and intake valves. Fig. 15 is a section through the exhaust ports showing the valve and plug. Fig. 16 is an enlarged view of the piston, and Fig. 17 is a view of the same at right angles thereto, both of these views being partially in section. Fig. 18 is a fragmentary view of the rotor rim and piston yoke showing the method of attachment.

Fig. 19 is a plan view of another form of device embodying three cylinders and revolving cylinder heads. Fig. 20 is an end elevation of the same. Fig. 21 is a sectional plan of Fig. 20, partly broken away. Fig. 22 is a transverse sectional elevation, the sections being taken at several different points. Fig. 23 is a longitudinal sectional elevation. Fig. 24 is a longitudinal section of the cylinders and gas intake chambers. Fig. 25 is an enlarged section of the spark plug and chamber for the form of engine shown in Fig. 20. Fig. 26 is a section of the valve chambers at right angles to Fig. 24. Fig. 27 is a similar section of the exhaust chambers and valves shown in Fig. 20. Fig. 28 is a section of the compression chamber, cylinder and exhaust therefor. Fig. 29 is an enlarged view of the piston for use in the form of engine shown in Fig. 20 and Fig. 30 is an end view of the same. Figs. 31, 32 and 33 are diagrams showing the different relations of the movable cylinder heads of the revoluble type, partially open, fully open and entirely closed, respectively.

Fig. 34 is a front elevation of means for oscillating instead of rotating the cylinder heads and Fig. 35 is a section of the same. Figs. 36 and 37 are diagrams of the heads in open and closed relations, respectively, and Figs. 38 and 39 are sectional diagrams at right angles to Figs. 36 and 37 showing the heads in their open and closed relations, respectively.

The several modifications herein shown will serve to convey an accurate idea of the conception and scope of my invention relative to the possible changes in the relation of the several cylinders and movable heads therefor without departing from the spirit of my invention, and as the specification progresses other modifications may suggest themselves to the reader, which while not specifically mentioned herein, will be considered to be within the scope of my invention.

Briefly described, my invention comprises a plurality of annular cylinders arranged conveniently to receive a plurality of rotatable pistons which are attached suitably to rotors operating at convenient points within the engine housing, and each of the cylinders being cut at diametrically opposite points by a pair of movable cylinder heads which are arranged to successively open and close the cylinders. The heads are opened to permit the passage of the pistons therethrough, and are closed immediately after the passage of the pistons so as to form a combustion chamber behind each of the pistons. One or more of the cylinders, depending upon the number used in an engine, is designed to be used for compressing the gas before the same is supplied to the combustion cylinders, and the pistons in the compression cylinders are driven by suitable means connected with the combustion cylinder pistons and rotors. Water cooling means is provided around the cylinders, and for the purpose of milling or boring out the cylinders, the castings in which they are formed are made in sections and tightly bolted together and packed in any suitable manner. Ordinary puppet valves are used for the several cylinders and the valves are operated by the rotors, thus insuring positive valve action and reducing the friction to a minimum.

I will first describe the form of engine shown in Figs. 1 to 18 inclusive. Nearly all of the operating parts of the engine are inclosed in a suitable casing composed of the end members 1 and 2 and the central members 3 and 4, which are bolted together by means of the external bolts 5 and the internal bolts 6 and 7, a disk or ring 8 being interposed between the members 3 and 4 for packing the casing between the two cylinders 9 and 10 which are formed in the casing members. The joints between the casing members are preferably on the cylinder center lines in order that the cylinders may be readily bored and finished to the desired size and suitable packing may be tightly clamped between the adjacent members of the casing to prevent leakage.

Water compartments 11, 12 and 13 are formed in the casing between the outer and inner walls and around the cylinders 9 and 10 for the purpose of cooling the cylinder walls and these compartments communicate by means of the passages 14 between the members 3 and 4, and 15 between the members 1 and 3, and 2 and 4, as shown in Fig. 4. These water passages extend through the tapered extensions 16 and 17 which seat in tapered apertures in the adjacent casing members, and the joints thus made may be packed by means of suitable packing rings 18, as shown in connection with the extension 17. The water is admitted through a neck 19 on the front end of the casing and is discharged through an outlet 20 near the top of the front end.

The inner portion of each of the cylinders communicates with an annular passage 21 which revolubly receives the rims 22 of the rotors 23, corresponding grooves 24 being formed on both the inner and outer sides of the rims 22 of the rotors and also in the opposite sides of the passages 21 to receive the annular packing rings 25 so as to pack the passages in which the rotors operate against the leakage of gas from the cylinders. The casing members 3 and 4 are provided with recesses to receive the webs 26 of the rotors 23 and also slightly deeper recesses to receive the relatively wider internal portions 27 of the rotors which are provided with gear teeth 28. At diametrically opposite points about the axis the casing members 3 and 4 are provided with pockets 29 and 30, these pockets being separated by the central disk 8, and pinions 31 and 31' are revolubly seated therein and mounted on the longitudinal shafts 32 and 32' which are journaled in the walls 33 and 33' of the pockets.

The ends 34 and 34' of the members 1 and 2 have bearings 35 and 35', respectively, in which the central longitudinally disposed shaft 36 is journaled, and the central portion of this shaft within the housing carries a double gear 37, having the toothed portions 38 and 38', the portion 38' meshing with and serving to drive a pinion 39 on one end of the shaft 32 and the pinion 39' on the opposite end of this shaft being driven by the gear portion 38'. All of the pinions just mentioned are adapted to revolve with the shafts 32 and 32' and the gear 37 with the shaft 36, the shaft 36 serving as a driving shaft for the engine and being extended at the front or the rear as may be found convenient so as to communicate the motion from the pistons to points external of the engine casing.

In all of the forms shown herein two pistons are shown and adapted to operate in each of the cylinders, both of the pistons of each pair being attached to a common rotor adjacent to each of the cylinders, but it is possible to add other cylinders and other pistons to each cylinder by slightly changing the valve mechanism and cylinder heads to correspond.

The casing members 1, 2, 3 and 4, at diametrically opposite points, in this case shown on the horizontal center line of the engine, are provided with horizontally extended cylinder head seats 40 and 40' which communicate by means of the passages 41 and 41' with the rotor passages 21 in the inner casing members to permit the passage of the piston yokes 98, as shown in Figs. 16, 17 and 18. The inner ends of the pockets 40 and 40' are slightly narrower than the outer ends in order that a bearing may be formed on each side to receive the cylinder head rods 42 and 42' which are attached to and serve to move the outer and larger cylinder heads 43 and 43' horizontally across the opening of the cylinders. The inner heads 46 and 46' also move across the cylinder openings and are provided with rods 45 and 45' which have bearings in the inner walls of the pockets 41 and 41'. It is preferable that the movement of the cylinder heads should be reduced to the minimum and for this reason the inner members 46 and 46' are adapted to move outwardly and the outer members 43 and 43' inwardly when the cylinders are closed, and in the opposite directions, respectively, when the cylinders are opened.

Because of apparent interferences, the rod 42 of the head member 43 is connected with the rod 45' of the head member 46', and the rod 42' of the head 43' is connected with the rod 45 of the head 46, respectively, by means of diagonal bars 47 and 47'. The opposite ends 48 of the bar 47 are turned upwardly and are suitably attached to the ends of the rods 42 and 45', and the similar ends 48' of the bar 47' are turned downwardly and are attached to the rods 42' and 45, as described, the bars being thus made to clear the drive shaft 36. Springs 49 are placed on the rods 45 and 45' and are adapted to compress between the walls of the pockets and the ends 48 and 48' of the bars 47 and 47'. A disk 49 is provided for each of the cylinders and suitably keyed to the drive shaft 36 for operating the cylinder heads twice in each revolution of the drive shaft and rotors, these elements being synchronous in operation. A pair of rollers 50 is provided at opposite points near the periphery of and attached to the disk 49 and each of the bars 47 and 47' has a curved cam plate, as at 51 and 51', respectively, with a short vertical extension, as at 52 and 52', the inner surfaces of which are adapted to be engaged at regular intervals in the operation of the cams by the rollers 50, as shown in Fig. 7. The opposite rollers 50 of the cam disk simultaneously engage the vertical sections of the cam plates 51 and 51', and this engagement is maintained for a sufficient time to insure the movement of the cylinder heads to their fullest extent, the rollers then engaging the curved portions of the plates and thus holding the heads immovable for a period of time while compression is taking place in one of the cylinders and combustion and forward movement of the pistons in the combustion cylinders.

The head members 43 of one set and 46' of the other set being connected and movable together, and the member 43' and 46 being similarly connected and simultaneously movable, it is obvious that with the cam arrangement shown and described, the cylinders will be entirely opened and closed at regular intervals and the springs 49 and 49' serve to restore the heads to their normally opened relations. The heads being thus normally open, the mechanism is insured against damage in the event of the breakage of the connecting bars and operating means.

I provide a tongue and groove connection or joint between the cylinder heads, as shown particularly in Figs. 8 and 9, tongues 53 being formed on one of the members of each set and corresponding grooves on the other members, so that a tight joint will be made when the heads are moved into closed relation. The tongues and grooves are preferably tapered, as shown, and if desirable, the tongues may be resiliently mounted so as to overcome and compensate for any wear thereon when in constant use. In this case the members 43 and 43' are provided with recesses 54 and 54', respectively, which receive the tongues 53, these members are bored at one or more points, as at 55 and counterbored at 56 and 57 in each member to receive pins 58 which are reduced at their inner ends and adapted to be suitably screwed or otherwise secured to the tongues. Springs 59 are carried by the pins and are compressible between the edges of the tongues 53 and the ends of the inner counterbores 57. The outer ends of the pins 58 have enlarged heads 60 which seat in the outer counterbores 56. In assembling these elements enough play should be provided for in order that any wear of the tongues or grooves 61 may be compensated for, and in addition, a resiliency is provided when the heads are engaged.

At diametrically opposite points in the casing and in the vicinity of the cylinders 9 and 10, intake chambers 62 and 63 are formed in the member 3, as shown in Fig. 5. Valves 64 are provided for each set of these chambers which have valve stems 65 slidably disposed in and extending through the outer walls of the annular rotor passages 21. The rotors 23 have annular grooves 66 formed in their peripheries which register with the valve stems and at diametrically opposite points on the rotors these grooves are filled with inserts 67, as shown in Fig. 10, which forms segmental valve operating portions, the valve stems riding in the bottoms of the grooves when the valves are closed and on the enlarged peripheral segments when they are opened. Valve seats 68 are formed between the chambers 62 and 63 of each set to receive the valves, and the outer ends of the stems 65 are slidably held in the closure heads 69 which are screwed into the outer wall of the casing. The valves are self restoring by means of the springs 70 carried on the stems 65 between the valves and the closure heads and compressible therebetween. Ports 70' connect the intake chambers 62 with the cylinders 9 for admitting the gas to the cylinders.

Means may be provided on the end member 2 of the casing for attaching a carbureter 71 and the gas intake from the carbureter, as at 72, may be suitably connected to the member 2 at a point on the center line of the cylinder 10, which is the compression cylinder of the engine. Communication is afforded between the carbureter and the cylinder 10 by means of the inlet 73, through which the pistons, when in operation, draw the fuel into the cylinder 10 and compress it, as will be hereinafter described.

The gas, after compression has taken place, is exhausted from the cylinder 10 through the ports 74, shown in Fig. 5, and by means of the chambers 75 in the casing member 4 and the valves 76, through the openings 77 in the valve head 78 into the chambers 63 in the member 3. Valve seats 79 are formed at the junctions of the chambers 75 and the ports 74 to receive the valves 76, and the valve stems 80 which carry the restoring springs 81 are slidably mounted in the heads 78 at the joint between the casing members 3 and 4 and the central disk therebetween. This valve head is shown in Fig. 14. Openings are formed around the valve stem bearings 82 and the inner ends of the heads are adapted to be suitably secured in the counterbored ends of the chambers 75 while the opposite ends are extended and tapered and are insertible through the disk 8 into the member 3 of the casing, suitable packing 83 being provided for making a gas tight joint at each place.

Spark plugs 84 are provided for each of the fuel intake chambers and at points slightly distant therefrom before the advance of the pistons. The plugs are screwed into the cylinder walls as usual and the inner spark ends thereof terminate in relatively small chambers 85, as shown in Fig. 6. The exhaust chambers 86 are formed in the casing members 1 and 2 at points on the opposite sides of the gas intake chambers from the spark plugs, so that the gases remaining in the cylinders just before an explosion takes place will be released prior to the opening of the cylinder heads. Ports 87 are formed in the walls of the cylinder 9 which communicate with the chambers 86 by means of the valve seats 88 in which are seated the exhaust valves 89. The chambers 86 have valve heads 90 secured therein at the end to slidably hold the valve stems 91 of the valves 89 and openings are formed in these heads to permit the passage of the gases therearound. Exhaust pipes 92 may be suitably attached to the casing at points opposite the chambers 86. The pressure in the cylinders caused by the advance of the pistons forces the valves open and the gases are exhausted, and the springs 93 on the valve stems 91 serve to restore the valves after each operation. All of the valves described in connection with my engine, it will be observed, are of the puppet variety and are thus dependable.

The pistons 94 are of sector formation and are provided with a pair or more of ordinary piston packing rings 95 which are seated in grooves 96 in the peripheries of the pistons. The pistons are attached to the rotor rims 22 by means of the yokes 98, the enlarged portion of the yokes being bored out to receive the reduced ends 99 of the pistons and suitably attached thereto by means of screws 100 and the flat portions 101 of the pistons being attached to the rotor rims 22 by means of screws, in the manner shown, or in any other suitable manner. The pistons are provided with separable rings 102 which may be secured suitably to the pistons, so that the yokes may be slipped on over the reduced ends thereof, the rings being placed on the pistons after the yokes are in place. The packing rings at the reduced ends of the pistons are held on the rings in such case, while the rings on the opposite end are carried by the pistons.

The water is supplied to the engine water jackets by means of the pump 103 on the shaft 103' which is supported revolubly in bearings 104 and 104' on the end casing member 1 and is operated by means of a sprocket 36' on the shaft 36 and a smaller sprocket 37' on the shaft 103', the sprockets being connected by a chain 36ª. The pump is connected with the water chambers 11, 12 and 13 of the casing by means of the pipe 19' which is attached to the inlet 19 on the casing and the pump inlet 19ª is adapted to be connected with a water tank, not shown. The water is discharged from the casing, after use, through the outlet 20 and the pipe 20' and is returned back to the tank, as in the usual case.

In the form of engine shown in the Figs. 19 to 39, it will be observed that three cylinders instead of two, as in the form just described, are provided, the end cylinders 9 being the combustion cylinders and the compression cylinder 10 being placed between the cylinders 9 and serving to supply both of them with fuel gas in a compressed state. In this form of engine, an annular compression chamber 105 is formed on the central members of the casing, and the gas, which is drawn by vacuum means from the carbureter 71, through the gas intake pipe 72, as shown in Figs. 19, 20 and 23, into the central cylinder 10, and is then compressed by the advance of the pistons and stored in the compression chamber 105 by means of the exhaust ports 106, as shown in Fig. 21. Valves 107 are provided in the compression chambers which are held by spring tension normally closed and the pressure in the cylinder 10 being greater than that in the chamber 105, the valves are opened to admit a charge of gas each time a piston is advanced over the center line, or twice in each revolution of the rotor.

The gas is admitted from the chamber 105 to the cylinders 9 through auxiliary chambers 108, shown in Fig. 21, which are provided with double puppet valves 109 with stems 110 extended through the inner walls of the casing where they are provided with rollers 111 revolubly held on members 112 and which are adapted to be regularly operated by the cams 113 on the central shaft 114. This arrangement of valves serves to equalize the pressure on the valves, so that when an explosion takes place in the cylinder 9, the pressure exerted on both of the valve members of the valve 109 will be equal and prevent the opening of the valve in such case. The valves and mountings therefor are otherwise similar to those used in connection with the other form of engine previously described.

The exhaust valves for the cylinders 9 in this form of engine, though slightly different in position and arrangement, are the equivalent of those previously described, except that a chamber 115 is provided for each valve which is formed on the exterior of the casing, and the exhaust pipes 116 are attached to the walls of these chambers by suitable clamps 117, or otherwise. The arrangement of the spark plugs in this case is identical with that described in connection with the other form.

Water jackets are provided between and around the cylinders, but the water compartments in each of the casing members is separate and provided with the individual inlets 118 which are connected with the water supply pipe 119 leading from and connected with the centrifugal pump 120. Separate outlets 121 for the water are also provided at the top of the casing for each of the members thereof, which are attached to a discharge pipe 122 which may lead to a radiator or other storage means, not shown. The casing members shown in this form are separated at the center to permit the operation of the rotary cylinder heads which will be hereinafter described, and for this reason pipes 123 are provided for connecting the upper and lower members at the ends, while communicating openings 124 are provided for the center casing members for the same reason. The openings 124 may be arranged and packed against leakage in a manner similar to the joints shown for this purpose in the other form of engine.

As shown in Figs. 21 and 23, the cylinders 9 and 10 are arranged with their centers on an arc so that if a disk were revolved horizontally a point on the disk would cut the center of each of the cylinders. Thus the rotors 23, there being one for each of the cylinders, vary slightly in diameter and peripheral speed. The rotors are however rotated at a uniform number of revolutions per minute. Each of the rotors is provided with internal gear teeth, as in the other form, which mesh with the thoroughly incased pinions 125 at diametrically opposite points carried by the shafts 126 and 127 journaled in the extensions 128 of the casing, the shaft 127 in this case being the driving shaft. A pinion 129 is provided on the shaft 127 which meshes with and drives the large gear 130 on the central shaft 114 which is journaled in suitable bearings in the ends of the casing. The speed of the shaft 114 is synchronous with that of the rotors so that the valve operating cams 113 may be properly timed.

At the junction of the upper and lower halves of the casing members, which are held together by means of bolts 131, an annular channel 132 is formed to revolubly receive the annular rings 133 and 133', one of these rings being arranged above and in revoluble contact with the other ring. Segmental apertures 134 are formed in each of the rings at diametrically opposite points, the extent of which is sufficient to permit the movement of all of the pistons, which operate in line, therethrough. These rings form the cylinder heads through which the pistons pass when the openings are in registration with the cylinders, and which serve to close the cylinders when the pistons have passed. Bevel gear teeth 135 are formed on the upper and lower sides, respectively, of the upper and lower cylinder head rings which mesh with and are adapted to be driven by pinions 136 carried by the shafts 137 which are supported revolubly in bearings 138 formed on the channel walls. The shafts also carry spur gears 139 which mesh with and are driven by the relatively larger gears 140 on the shafts 126 and 127, the ratio of the gears being such that the speed of the cylinder heads will be substantially equal to that of the pistons. I provide the driving mechanism for the cylinder heads on both ends of the engine in order that the same may be properly balanced.

The rotatable cylinder heads are arranged, as shown in the diagrams in Figs. 31, 32 and 33, so that the central set of pistons may, if desirable, be operated slightly in advance of the pistons in the cylinders 9 at the end. In this case the end portions of the openings in the rotating heads will provide clearance for the passage of the central pistons, and as the opening becomes wider, as shown in Fig. 32, the end pistons may pass through, the central set of pistons being in the meantime compressing gas into the compression chamber 105 for use with the pistons in the cylinders 9. The head openings are shown entirely closed in Fig. 33.

In Figs. 34 to 39 inclusive I show means for effecting the oscillation of the cylinder heads with the form of engine last described, as this may be sometimes found to be more preferable. This means comprises the formation of bevel sector portions 141 on the rings 133 and 133' instead of the continuous gears just described, which are meshed with the bevel pinions 136 as in the other form. A relatively smaller pinion 142 is provided on the shaft 137 which meshes with and is operated by a larger idler gear 143 on the extended end of the shaft 127. The shaft 127 also carries another pinion 144 which is keyed thereto and revolves therewith and drives a substantially larger gear 145 on a stud 146 secured in the casing below the shaft 127. A depending arm 147 is secured by means of its hub 148 and a set screw 149 to the reduced end of the hub of the gear 143, and extends downwardly in front of the gear 145. This arm has an elongated slot 150 which is straight at the ends and curved in the center to conform to a radial line concentric with the axis of the gear 145 when the arm is at either extreme of its movement. This slot is engaged continuously by a roller 151 carried by the gear 145, which causes the arm to oscillate backwardly and forwardly in front of the gear. The straight portions of the slot, when engaged by the roller, serving to move the arm in one or the other direction and the curved portions of the slot serving to maintain the arm in its extended position for a period of time while the roller is moving therein.

By the above actuating mechanism, the cylinder heads may be oscillated back and forth across the cylinder openings to permit the passage of the pistons and to close the cylinders during compression and combustion. The rings 133 and 133' in this case have circular openings 153 for each cylinder which are extended inwardly at radial points to permit the passage of the piston yokes when the cylinders are open. Figs. 38 and 39, show the relative positions of the ring openings when the cylinders are opened and closed. The pistons for use in the rotatable or oscillating heads are slightly different from those used with the reciprocating heads, as shown in Figs. 29 and 30, the yokes being secured to the piston bodies at both ends and the rings being placed between the yoke rings.

In operation, the gas is supplied to the compression cylinder 10 from the carbureter 71 through the pipe 72 and the operation of the pistons in this cylinder serves to compress the gas between the pistons and the closed cylinder heads. The compression exhaust valves being set with the proper tension, when the pressure in the cylinder 10 reaches a certain point these valves will open and admit a charge of gas in its compressed state to the cylinders 9 in the form of engine first described, and in the last described form, the gas will be admitted to the chamber 105 at each operation of the pistons.

The gas is held in a compressed state in the chamber 105 and is regularly discharged therefrom by means of the intake valves into the cylinders 9, or in the other form, the gas may be directly discharged from the cylinder 10 to the cylinders 9, just after the cylinder heads have been moved to completely close the combustion cylinders. The spark plugs 84 may be so timed that explosions of the gas will take place immediately after the charge of gas into the cylinders 9, and the pistons will be moved forward in the cylinders until the force of the explosions is expended.

The movement of the pistons in the cylinders 9, through the medium of the connections described also effects the simultaneous movement of those in the cylinders 10 which compress the gas, and the different sets of pistons may be so arranged relative to each other that the compression of the gas will take place just prior to the charging of the cylinders in either of the forms of device described.

Through the geared connections described, the rotors connected with the combustion cylinders and pistons serve to operate the pistons in the compression cylinder as well as the drive shaft which communicates the power to points external of the engine casing, and as has been stated, the movement of the cylinder heads of either form is accomplished simultaneously with the movement of the pistons, so that all operating parts are synchronous and perfectly timed with each other.

In order that the friction between the movable cylinder heads may be reduced to a minimum any suitable form of antifriction means may be used such as rollers, or the like, but it is not deemed necessary that such means be shown to properly illustrate my invention, these elements being well known expedients. Still other modifications and additions may be resorted to for improving the operation of the engine, as for instance the casing of the engine being thoroughly inclosed and the majority of the operating parts being within the casing, the central chamber of the casing in which the gears and other parts are placed, may be completely filled with lubricating oil for rendering the operation of the engine noiseless and providing ample lubrication of the several elements.

The form of engine shown partakes of the general dimensions and character of a common type of automobile engine or motor which may be suitably attached by means of the feet provided near the bottom to the running gear frame of the vehicle, as in the usual case, but it is obvious that the form of the casing may be changed so that the engine may be used for stationary purposes and a substantial base may be provided in such case.

Having thus described my invention, what I claim, is:

1. In an internal combustion engine, the combination of an annular cylinder, means for alternately opening and closing the bore of the cylinder, with a piston adapted to revolve in the cylinder and borne upon a rotor revolving in an annular chamber concentric and continuous with the cylinder and operatively connected with a driving shaft by means of a member rotatably seated in the casing of the chamber.

2. In an internal combustion engine, the combination of an annular cylinder, means for alternately opening and closing the bore of the cylinder, with a piston adapted to revolve in the cylinder and borne upon a cogged rotor revolving in an annular chamber concentric and continuous with the cylinder and meshing with a pinion also internal and fixed upon a spindle journaled in the casing of the chamber and bearing likewise a fixed pinion rotating externally to the chamber and operatively connected with a driving shaft.

3. In an internal combustion engine, the combination of an annular cylinder adapted to the compression of explosive gas, an annular cylinder adapted to receive and explode compressed gas, a connecting passage for the flow of gas from the first named cylinder to the second, means for alternately opening and closing the bore of each cylinder, with pistons adapted to revolve in the cylinders and borne upon rotors revolving in annular chambers concentric and continuous with the cylinders and operatively connected with a driving shaft by means of members rotatably seated in the casings of the chambers.

4. In an internal combustion engine, the combination of an annular cylinder adapted to the compression of explosive gas, an annular cylinder adapted to receive and explode compressed gas, a connecting passage for the flow of gas from the first named cylinder to the second, means for alternately opening and closing the bore of each cylinder, with pistons adapted to revolve in the cylinders and borne upon cogged rotors revolving in annular chambers concentric and continuous with the cylinders and meshing with pinions also internal and fixed upon spindles journaled in the casing of the chamber and bearing likewise fixed pinions rotating externally to the chambers and operatively connected with a driving shaft.

Signed at Los Angeles, in the county of Los Angeles, and State of California, this 8th day of June 1916.

OSCAR C. BEARD.

Witnesses:
 Geo. E. Marlatt,
 Luther L. Mack.